March 18, 1947.　　　　S. A. CROSBY　　　　2,417,469
LUBRICATING SYSTEM FOR PORTABLE RUBBING MACHINES
Filed Dec. 2, 1944

Inventor:
Stephen A. Crosby,
By Chritton, Wiles, Schroeder,
Merriam & Hofgren, Attys.

Patented Mar. 18, 1947

2,417,469

UNITED STATES PATENT OFFICE 2,417,469

LUBRICATING SYSTEM FOR PORTABLE RUBBING MACHINES

Stephen A. Crosby, Chicago, Ill., assignor to Sterling Tool Products Company, a corporation of Illinois Application December 2, 1944, Serial No. 566,347

3 Claims. (Cl. 51—170)

This invention relates to rubbing machines, and more particularly to small portable power driven sanders or polishing machines, which may operate on various parts of a structure.

The primary object of the present invention is to provide a portable rubbing machine with an improved lubricating system, and to prevent oil from leaking out of the machine onto the work, even though the machine is operated in inverted position.

The present structure is an improvement on the rubbing machine shown in my application Serial No. 504,855, filed October 4, 1943, which matured as Patent No. 2,395,537, dated February 26, 1946.

The invention is illustrated in a preferred embodiment in the accompanying drawing, in which—

Figure 1:
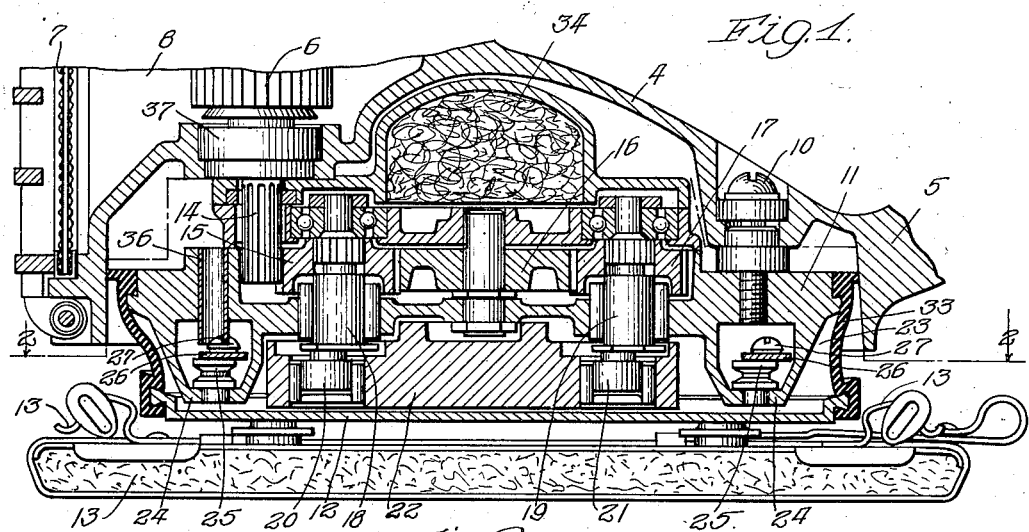
Figure 2:
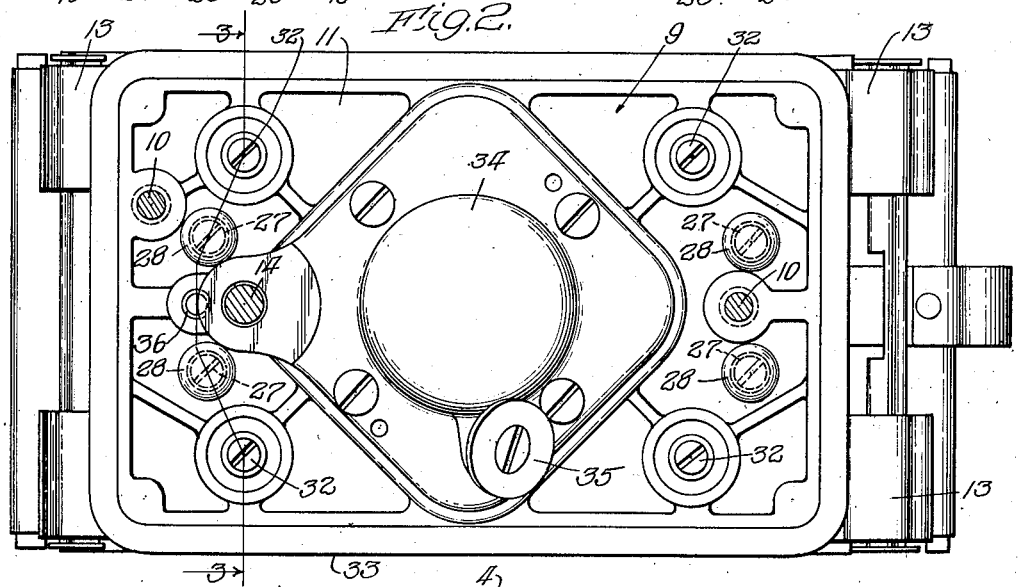

Figure 1 is a fragmentary vertical sectional view of a rubbing machine embodying the invention; Fig. 2, a plan view of the transmission and rubbing head, taken as indicated at line 2—2 of Fig. 1; and Fig. 3, a vertical sectional view taken as indicated at line 3—3 of Fig. 2.

In the embodiment illustrated, a supporting frame 4, provided with a handle 5, contains an electric motor 6, which drives the transmission unit and is equipped with a fan, which draws air through a filter 7 and produces a partial vacuum in the space 8 around the motor. A transmission unit 9 is secured to the supporting frame by means of two screws 10. The transmission has a top panel 11 and a driving head 12, which is mounted for orbital movement with respect to the panel 11 and the supporting frame of the machine. A suitable rubbing pad 13 may be attached to the head 12. As described in detail in my application Serial No. 504,855, the motor 6 drives the various moving parts by a gear 14, in mesh with a gear 15, which drives a central gear 16 in mesh with a gear 17. The gears 15 and 17 drive a pair of crank shafts 18 and 19, which are journalled in the fixed portion of the transmission unit and have excentric heads 20 and 21, respectively, which impart orbital movement to a counterpoise 22, disposed in a compartment 23, formed between the driving head 12 and the top panel 11. The gear 16 also drives another pair of crank shafts, not shown, which impart orbital movement to the drive head 12, in out-of-phase relation to the movement of the counterpoise 22.

Figure 3:
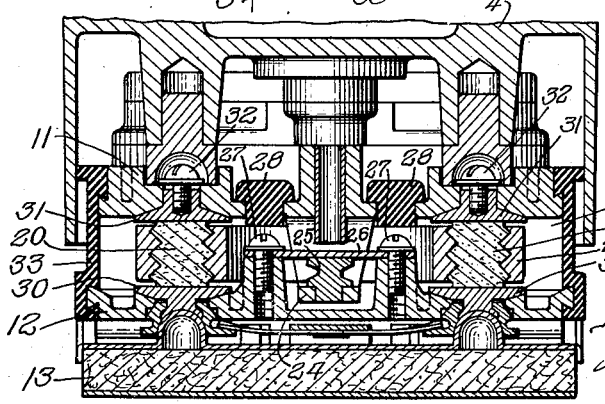

As shown in Figs. 1 and 3, the top panel 11 is provided with depending stirrups 24, having thrust bearings 25 to engage a cross-bar 26, which is secured to the drive head by means of screws 27. In order to assemble the device, it is necessary to provide holes through the top panel 11, to enable a screw-driver to reach the screws 27. These holes are then sealed by rubber plugs 28, which are preferably cemented in place, to prevent any oil from leaking through.

As best shown in Fig. 3, the counterpoise 22 is provided with thrust bearings in the form of carbon inserts 29, to bear against metal pads 30 in the drive head, and also metal pads 31 which are secured to the top panel 11 by means of screws 32. These screws are held by lock washers and are oil-tight.

A flexible perimetral sleeve 33 is cemented to the top panel 11 and also to the rubbing head 12, so that oil may not leak out of the compartment and dirt will not get in.

The upper portion of the transmission unit is provided with an oil reservoir 34, provided with a filler cap 35, and in operation oil seeps down through the packing into the transmission unit. The rubbing head is preferably driven at about 45,000 R. P. M. in a $\frac{3}{16}$ of an inch orbit. As the machine warms up, an oil mist is formed in the compartment containing the counterpoise, and the movement of the rubbing head causes considerable turbulence. A vent pipe 36 extends through the top panel 11 and extends below the inner top face of the panel, so that an oil trap is provided, and oil will not drain out of the compartment through the pipe even though the entire machine is operated in inverted position. As the motor causes a partial vacuum above the top panel of the transmission unit, some oil mist is drawn up and will lubricate the ball bearing unit 37 at the bottom of the motor 6.

The foregoing detailed description is given for clearness of understanding only, and no unnecessary limitations should be understood therefrom, for some modifications will be obvious to those skilled in the art.

I claim:

1. A machine of the class described, comprising: a supporting frame; a transmission unit secured to said frame and including a depending rubbing head mounted for orbital movement with respect to the frame, and a counterpoise in said unit for balancing out inertia forces in the rubbing head when driven at high speed; thrust bearings for transmitting pressure from the supporting frame to the rubbing head; an oil reservoir on said transmission unit communicating with the interior of said unit; means for sealing the compartment containing the counterpoise between the rubbing head and upper fixed portion of the transmission unit; and a vent pipe through the upper portion of the unit and extending below the inner top face of said unit into said compartment to form an oil trap.

2. A machine as specified in claim 1, in which the sealing means includes a flexible perimetral sleeve cemented to the rubbing head and fixed portion of the unit, and rubber plugs cemented in tool holes in said unit.

3. A machine as specified in claim 1, in which a motor with a suction fan is provided in the supporting frame for driving the transmission unit and has a lower bearing near the upper end of the vent pipe so that oil mist will be drawn by said fan through the vent pipe and lubricate said lower bearing.

STEPHEN A. CROSBY.